3,576,028
POLYALKOXYSILANES
John G. Fish, Garland, Tex., assignor to Texas
Instruments Incorporated, Dallas, Tex.
No Drawing. Filed July 31, 1968, Ser. No. 748,941
Int. Cl. C08f *11/04;* C08g *31/02;* C07f *7/04*
U.S. Cl. 260—448.8                                    7 Claims

ABSTRACT OF THE DISCLOSURE

Polyalkoxysilanes having repeating structural units which may be represented by the formula:

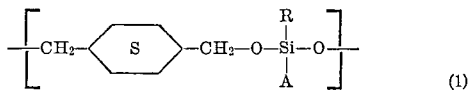

(1)

where R and A are each selected from the group consisting of hydrogen, monovalent hydrocarbon radicals and oxy, carboxy, alkoxy and halogen substituted derivatives thereof.

A straight chain polyalkoxysilane will be represented by the Formula 1 where R and A are methyl radicals, for example, and a cross-linked polysiloxane will be represented by the formula when R represents the methyl group, and A represents the following monovalent, alkoxy substituted hydrocarbon radical, for example,

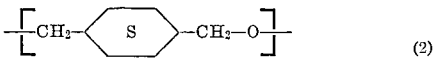

(2)

when the —O— atom is bound to the silicon atom in Formula 1 above and the methylene group is linked to another structural unit such as represented in Formula 1.

---

This invention relates to organosilicon compounds, and more particularly to polyalkoxysilanes.

Polyalkoxysilanes are known to the art, but serve limited use because of the inherent hydrolytic instability of the Si—O—C bond. Thus, an elastomeric or resinous polyalkoxysilane made from an ordinary aliphatic diol and a dialkyldichlorosilane could, under hydrolytic conditions, depolymerize or rearrange to produce glycol and low molecular weight siloxanes.

The present invention provides polyalkoxysilane compositions of increased hydrolytic stability.

The invention may be generally described as a polyalkoxysilane composition having repeating structural units represented by Formula 1 above where the symbols used in such formula are as defined above.

The polyalkoxysilane of the present invention may be synthesized in either of two fashions. One method of synthesizing the compounds is by reaction of cyclohexane dimethanol with a silane having the general formula R(A)SiX$_2$ and pyridine where R and A are as defined above and X represents chlorine, bromine or iodine. An example of such reaction would be the reaction of cyclohexane dimethanol, dimethyldichlorosilane, and pyridine as represented by the following equation:

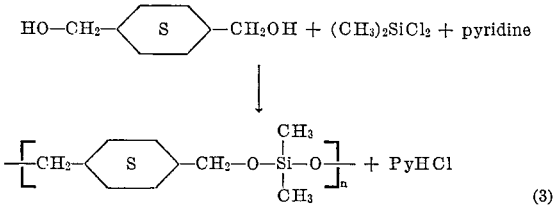

(3)

Alternatively, the polyalkoxysilanes of the present invention may be synthesized by reaction of cyclohexane dimethanol with a diorganodialkoxysilane represented by the general formula R(A)Si(OR$_1$)$_2$ where R and A are as defined above and R$_1$ may be any monovalent saturated aliphatic radical. An example of such a reaction, which is conducted under basic conditions would be the reaction of cyclohexane dimethanol and dimethyldiethoxysilane, as represented by the following equation:

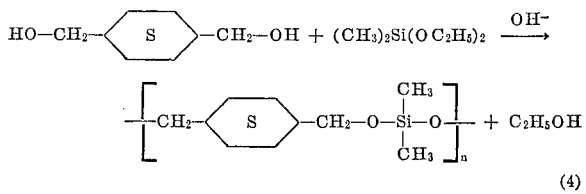

(4)

In both reactions (3) and (4) the polyalkoxysilane product may be end-blocked by silanol radicals, radicals represented by the formula

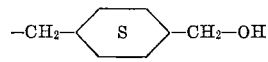

or both.

For a more specific description of the manner of carrying out the synthesis of polyalkoxysilane of the present invention by reaction (3) above, reference is made to the following example:

EXAMPLE I

Into a 1 liter flask were placed 36.1 grams (0.25 mole) of cyclohexane dimethanol, 44.13 grams (0.558 mole) pyridine and 500 ml. of benzene. After thorough mixing of the three constituents there was slowly added to the flask, while stirring the contents of the flask, 32.2 grams (0.2495 mole) dimethyldichlorosilane. After additions of the dimethyldichlorosilane, the contents of the flask were filtered to remove the pyridinium hydrogen chloride salt and the filtrate washed with water to remove excess pyridine and diol, both of which are water soluble. As a trace of pyridine odor was detected in the organic liquid separated from the wash vessel, ethyl chloride was added to the organic liquid and the two were thoroughly mixed.

Sodium sulfate was then added, the resulting mixture dried and filtered. The benzene solvent was then removed by vacuum evaporation leaving 43.8 grams of the product, which is represented by Formula 2 above. The density of the polyalkoxy silane was 1.0183, its refractive index ($n_D{}^{25}$) 1.04726 and its specific refractivity ($R_D{}^{25}$) 0.2753. The specific refractivity compared quite closely with the calculated specific refractivity ($R_D{}^{25}$) of 0.2775.

Reference is here made to the following example for a specific description of a manner for carrying out the synthesis of polyalkoxysilane of the present invention by use of reaction (4) above.

EXAMPLE II

To a 500 ml. round bottom flask containing 28.8 grams (0.2 mole) of cyclohexane dimethanol was added 29.6 grams (0.2 mole) of dimethyldiethoxysilane. The contents of the flask were then heated to melt the alcohol and between ¼ and ½ pellet of potassium hydroxide was added to initiate the reaction. The contents of the flask were distilled, after the reaction had been completed to remove the ethyl alcohol produced in the reaction and the unreacted dimethyldiethoxysilane. Following distillation, the residue from the distillation was subjected to vacuum evaporation to remove all traces of volatile constituents leaving a polyalkoxysilane residue, represented by Formula 2 above, which weighed 34.7 grams.

Physical property test revealed that the density of the product was 1.0172, the refractive index ($n_D{}^{25}$) of 1.04729 and a specific refractivity ($R_D{}^{25}$ of 0.2757 which compared closely with the calculated refractivity ($R_D^{25}$) of 0.2775. The molecular weight of the product, determined cryoscopically in benzene, was 2742.

The polyalkoxysilanes synthesized in Examples I and II are linear polyalkoxysilanes.

Cross-linked polyalkoxysilanes may be synthesized by using tri-functional reactants in reactions (3) and (4). Specifically, if methyltrichlorosilane were used in reaction (3), rather than dimethyldichlorosilane, the resulting polyalkoxysilane would be formed of repeating structural units represented by the formula:

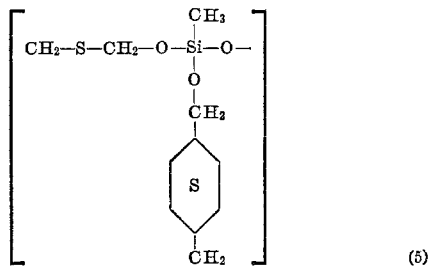 (5)

A polyalkoxysilane having the same structural units as those identified in Formula 5 will be produced by the use in reactions (4) of methyltriethoxysilane rather than dimethyldiethoxysilane.

The polyalkoxysilanes of the present invention fined particular utility as heat transfer and hydraulic fluids as well as in plastic encapsulating applications, sealing compounds and as modifiers for silicone rubber used as electrical insulation material.

While rather specific terms have been used to describe several embodiments of the invention, they are not intended, nor should they be construed as a limitation upon the invention as defined by the claims.

What is claimed is:

1. Polyalkoxysilane compositions having repeating structural units which may be represented by the formula:

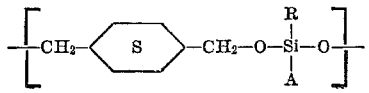

where R and A are selected from the group consisting of hydrogen, lower alkyl and alkoxy radicals.

2. The compositions of claim 1, wherein R is a lower alkyl radical.

3. The compositions of claim 2, wherein A is a lower alkyl radical.

4. The compositions of claim 3, wherein A is an alkoxy radical.

5. The compositions of claim 4, wherein the alkoxy radical has the following formula:

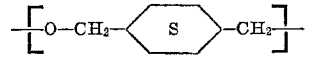

where the oxygen atom is bound to the silicon atom and the methylene group is bound to a structure unit defined in claim 1.

6. The composition of claim 1 wherein R and A are methyl groups.

7. The composition of claim 1, wherein R is a methyl group and A is a radical having the formula:

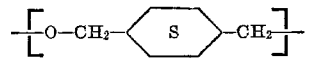

where the oxygen atom is bound to the silicon atom and the methylene group is bound to a structural unit defined in claim 1.

References Cited

UNITED STATES PATENTS

| | | | |
|---|---|---|---|
| 3,341,469 | 9/1967 | Pines et al. | 260—448.8 |
| 3,346,515 | 10/1967 | Curry | 260—2 |
| 3,388,144 | 6/1968 | Musolf et al. | 260—448.8 |
| 3,433,818 | 3/1969 | Dunnavant et al. | 260—448.8X |

JAMES E. POER, Primary Examiner

W. F. W. BELLAMY, Assistant Examiner

U.S. Cl. X.R.

260—46.5, 2